United States Patent

Freese, V et al.

(10) Patent No.: US 8,191,915 B2
(45) Date of Patent: Jun. 5, 2012

(54) VEHICLE DOCKING ASSISTANCE SYSTEM

(75) Inventors: Charles E. Freese, V, Ira Township, MI (US); Brent D. Hendrickson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 579 days.

(21) Appl. No.: 12/253,274

(22) Filed: Oct. 17, 2008

(65) Prior Publication Data

US 2010/0096203 A1    Apr. 22, 2010

(51) Int. Cl.
- *B60D 1/36* (2006.01)
- *B60T 7/16* (2006.01)
- *G08B 21/00* (2006.01)

(52) U.S. Cl. ... 280/477; 180/167; 340/431; 340/539.25; 340/686.2

(58) Field of Classification Search ............ 280/455.1, 280/477, 439, 511; 303/123, 124; 340/431, 340/435, 465, 539.25, 686.2; 1/455.1, 477, 1/439, 511; 701/50, 213; 180/167

See application file for complete search history.

(56) References Cited

U.S. PATENT DOCUMENTS

| | | | |
|---|---|---|---|
| 4,186,939 A * | 2/1980 | Woods et al. | 280/477 |
| 4,824,135 A * | 4/1989 | McGregor | 280/442 |
| 4,938,495 A * | 7/1990 | Beasley et al. | 280/477 |
| 5,108,123 A * | 4/1992 | Rubenzik | 280/477 |
| 5,201,836 A * | 4/1993 | DeWitt | 280/426 |
| 5,650,764 A * | 7/1997 | McCullough | 340/431 |
| 5,729,194 A * | 3/1998 | Spears et al. | 340/431 |
| 5,951,035 A * | 9/1999 | Phillips et al. | 280/477 |
| 6,100,795 A * | 8/2000 | Otterbacher et al. | 340/431 |
| 6,178,650 B1 * | 1/2001 | Thibodeaux | 280/477 |
| 6,900,724 B2 * | 5/2005 | Johnson | 340/431 |
| 7,243,431 B2 * | 7/2007 | Godwin | 280/477 |
| 7,354,057 B2 * | 4/2008 | Milner et al. | 280/477 |
| 7,396,035 B1 * | 7/2008 | Smith | 280/477 |
| 7,438,368 B2 * | 10/2008 | Kohler et al. | 303/123 |
| 7,775,543 B2 * | 8/2010 | Hermon et al. | 280/477 |
| 7,777,615 B2 * | 8/2010 | Okuda et al. | 340/431 |
| 7,904,226 B2 * | 3/2011 | Dix | 701/50 |

* cited by examiner

*Primary Examiner* — Hau Phan

(57) ABSTRACT

An automatic docking system for docking a towing vehicle with a towed vehicle includes a sensing device, a controller, an automatic steering system, an automatic braking system, and a plurality of targets. The sensing device detects the plurality of targets located on a hitch of the towed vehicle. The controller determines the location of the towing vehicle relative to the towed vehicle based on the detection of the plurality of targets. The controller automatically steers the towing vehicle towards the towed vehicle to assist in the docking of the towing vehicle to the towed vehicle. The controller engages the automatic braking system to slow or stop the towing vehicle as required.

15 Claims, 2 Drawing Sheets

VEHICLE DOCKING ASSISTANCE SYSTEM

FIELD

The invention relates generally to a docking assistance system for a vehicle. More particularly, the invention relates to a system for directing a towing vehicle towards a towed vehicle.

BACKGROUND

Many vehicles, including cars, trucks, tractors, and other off-road vehicles, are capable of towing a vehicle. Examples of towed vehicles include trailers, campers, farming equipment, construction equipment, or other motor vehicles. Typically, the towing vehicle is coupled to the towed trailer or vehicle by a hitching system. The hitching system typically includes two coupling components, such as a ball and a hitch, which can be removably coupled together. The coupling components are coupled together by aligning the coupling component of the towing vehicle with the coupling component of the towed vehicle and moving one or both of the towing vehicle and the towed vehicle together.

However, coupling the towing vehicle to the towed vehicle can be difficult to perform, primarily because the operator of the towing vehicle does not have a direct line of sight to the ball and hitch of the hitching system. Even where a direct line of sight is possible or other assistance is available, such as an electronic sensing system that signals to the operator of the towing vehicle the distance between the ball and hitch, inaccuracy of alignment and positioning is still possible. Accordingly, there is a need in the art for a docking assistance system that directs a towing vehicle toward a towed vehicle with minimal input from the operator of the towing vehicle.

SUMMARY

The present invention provides an automatic docking system for docking a towing vehicle with a towed vehicle. The automatic docking system includes a sensing device, a controller, an automatic steering system, an automatic braking system, and a plurality of targets. The sensing device detects the plurality of targets located on a hitch of the towed vehicle. The controller determines the location of the towing vehicle relative to the towed vehicle based on the detection of the plurality of targets. The controller automatically steers the towing vehicle towards the towed vehicle to assist in the docking of the towing vehicle to the towed vehicle. The controller may engage the automatic braking system to slow or stop the towing vehicle.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
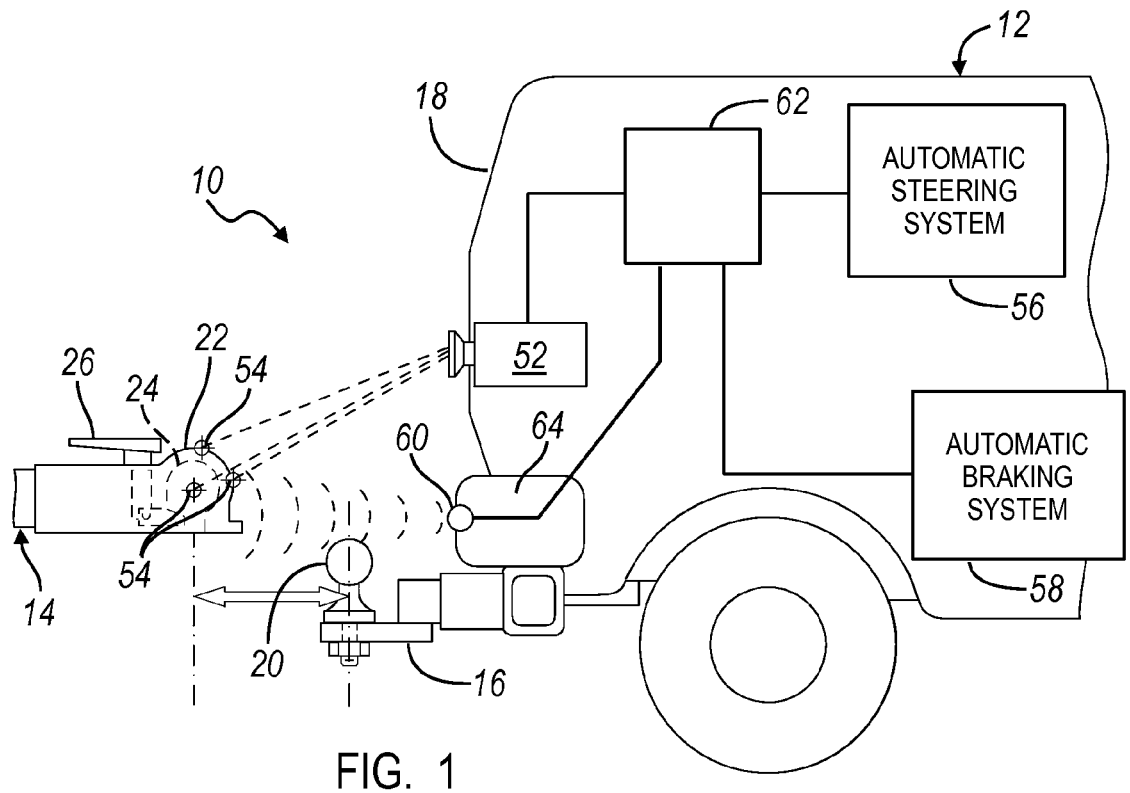
FIG. 1 is a schematic diagram of an embodiment of a docking assistance system according to the principles of the present invention.

With reference to FIG. 1, a system for assisting in the docking or coupling of a first vehicle with a second vehicle is generally indicated by reference number 10. The docking assistance system 10 is employed with an exemplary towing vehicle 12 as the first vehicle and an exemplary towed vehicle 14 as the second vehicle. It should be appreciated that the towing vehicle 12 may take various forms without departing from the scope of the present invention, such as, for example, a car, truck, tractor, or other off-road vehicle. Likewise, it should be appreciated that the towed vehicle 14 may take various forms such as, for example, a trailer, camper, or another motor vehicle. The towing vehicle 12 generally includes a tongue 16 that extends from a rear 18 of the towing vehicle 12. A vehicle coupling member or ball 20 is fixedly secured to a bumper or other standard component at an end of the tongue 16. The towed vehicle 14 generally includes a remote coupling member or hitch component 22 that defines a ball receiver 24. The ball receiver 24 is sized to receive the ball 20 of the towing vehicle 12, as will be described in greater detail below. A locking mechanism 26 is coupled to the hitch component 22 and is operable to selectively lock the ball 20 within the ball receiver 24. It should be appreciated that the vehicle coupling member 20 and remote coupling member 22 may take various forms other than the ball and ball receiver without departing from the scope of the present invention.

The docking assistance system 10 includes a sensing device 52, a plurality of sensing elements or targets 54, an automatic steering system 56, an automatic braking system 58, at least one object pre-impact sensor 60, and a controller 62. The sensing device 52 is operable to sense the plurality of targets 54, as will be described in greater detail below. In the present embodiment, the sensing device 52 is an optical detection mechanism, such as a video camera, mounted at the rear 18 of the towing vehicle 12. However, it should be appreciated that the sensing device 52 may be any device capable of sensing the plurality of targets 54. Examples include, but are not limited to, infrared cameras, radar or sonic emitters, and/or magnetic detection devices.

The plurality of targets 54 are mounted or otherwise attached to the hitch 22 of the towed vehicle 14 a known or calibrated distance apart from one another. The targets 54 may be attached to the hitch 22 by various means, including, for example, magnets or adhesives. Alternatively, the targets 54 may be integrally formed on the hitch 22. The targets 54 in the embodiment provided are colored discs able to provide a visual contrast with the hitch 22 so that the sensing device 54 may sense or detect the location of the plurality of targets 54. However, it should be appreciated that the type of target 54 employed will depend on the type of sensing device 52 mounted to the towing vehicle 12. Additionally, while three targets 54 are employed in the present embodiment, it should be appreciated that any number of targets 54 may be employed so long as there are at least two targets 54 located a known distance apart from each other.

The automatic steering system 56 is located within the towing vehicle 12 and is operable to steer the towing vehicle 12 without input from an operator or driver of the towing vehicle 12. The automatic steering system 56 may be, for example, the active front wheel steering system as described in commonly assigned U.S. Pat. No. 7,181,326 filed on Dec. 20, 2004, and hereby incorporated by reference as if fully disclosed herein.

The automatic braking system 58 is also located within the towing vehicle 12 and is operable to automatically engage and disengage one or more brakes (not shown) within the towing vehicle 12 in order to stop the towing vehicle 12 from moving. The automatic braking system 58 may be a separate system coupled to the brakes or part of an anti-lock braking system or traction control system. An exemplary anti-lock braking system and traction control system having automatic braking is described in commonly assigned U.S. Pat. No. 5,163,744 filed on Oct. 21, 1991, and hereby incorporated by reference as if fully disclosed herein.

The object pre-impact sensor 60 is located at the rear 18 of the towing vehicle 12, for example on a rear bumper 64, and is operable to detect the presence of objects behind the towing vehicle 12. The object pre-impact sensor 60 may take various forms, such as a radar or sonic emitter and detector, that emits a signal to detect objects behind the towing vehicle 12.

The controller 62 is, for example, a vehicle control module, or other electronic device having a preprogrammed digital computer or processor, control logic, memory used to store data, and at least one I/O peripheral. However, other types of controllers may be employed without departing from the scope of the present invention. The controller 62 is in communication with the sensing device 52, the automatic steering system 56, the automatic braking system 58, and the object pre-impact sensor 60. More specifically, the controller 62 is configured to receive data signals from the sensing device 52 and the object pre-impact sensor 60 and to send control signals to the automatic steering system 56 and the automatic braking system 58.

Figure 2:
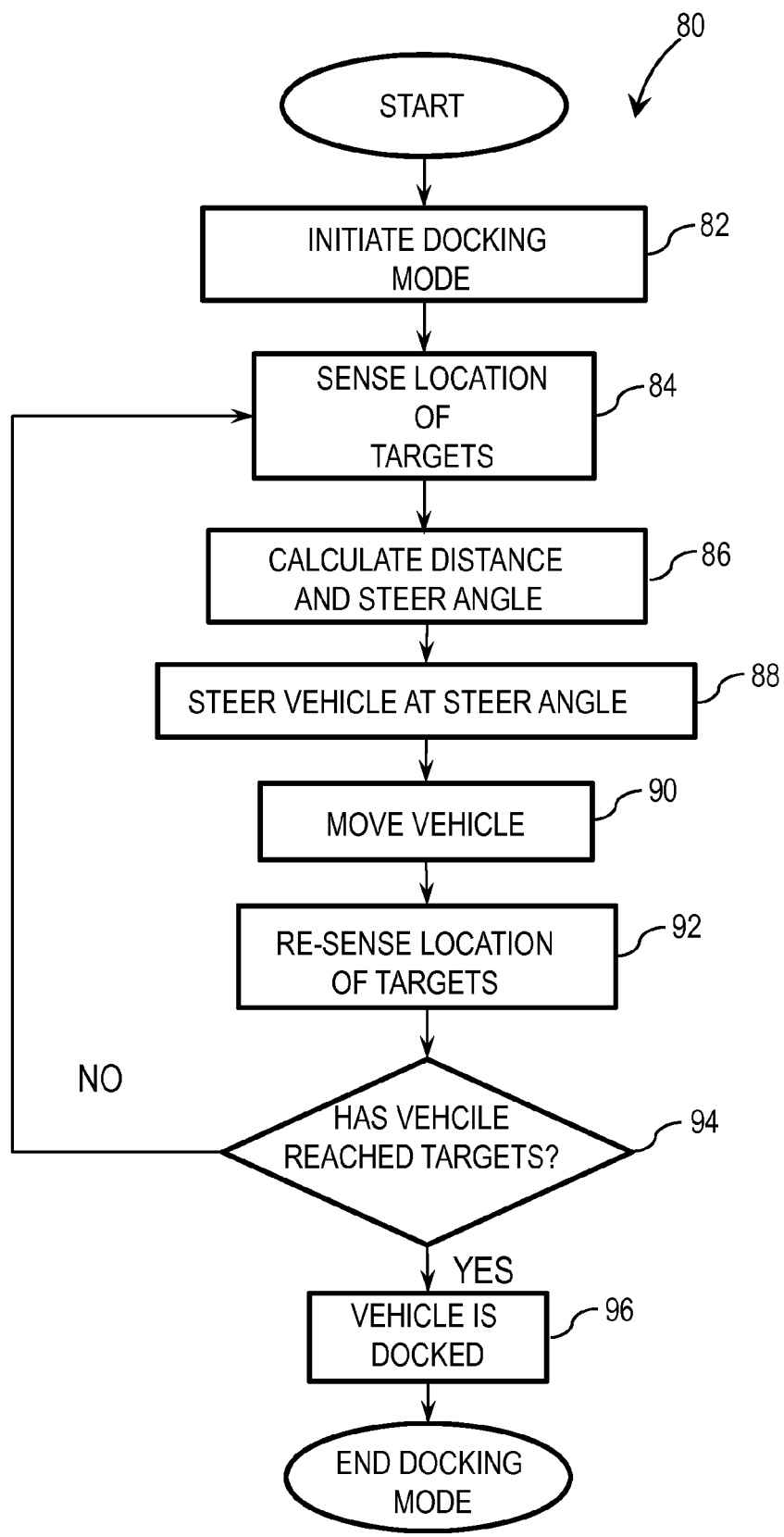
FIG. 2 is a method for operating the docking assistance system of the present invention.

Turning to FIG. 2, a method for operating the docking assistance system 10 is generally indicated by reference number 80. It should be appreciated that steps in the method 80 preferably correspond to control logic in the controller 62. The docking system 10 is activated when an operator of the towing vehicle 12 initiates a docking mode indicative of a desire to dock the ball 20 with the hitch 22 at step 82. Initiation of the docking mode may be accomplished by engagement of a switch or lever (not shown) in the towing vehicle 12 that communicates with the controller 62. Then, the sensing device 52 senses the location of the targets 54 at step 84. The controller 62 receives an input signal indicative of the sensed location of the targets 54 and calculates a distance and a steer angle at step 86. The distance is the distance between the targets 54 and the ball 20 and the steer angle is the angle between the ball 20 and the target 54 relative to a longitudinal axis of the towed vehicle 14. In other words, the steer angle is the angle the towing vehicle 12 should be steered to in order to align the ball 20 with the hitch 22. The controller 62 calculates the steer angle and the distance using software algorithms that compare the position of the detected targets 54 as perceived by the sensing device 52 to the actual known or calibrated position of the targets 54 on the hitch 22. The controller 62 then sends a control signal to the automatic steering system 56 commanding the automatic steering system 56 to steer a plurality of steerable wheels (not shown) on the towing vehicle 12 at the steer angle at step 88 in order to direct the towing vehicle 12 toward the towed vehicle 14 to align the ball 20 with the hitch 22. Then, the towing vehicle 12 is moved at step 90. The towing vehicle 12 may be moved by the operator of the towing vehicle 12 by releasing the brakes. Alternatively, the brakes may be controlled by control signals from the controller 62 to the automatic braking system 58. In vehicles that include an automatic electronically controlled suspension, the controller 62 may control the height of the towing vehicle 12 to lower or raise the ball 20 to position the ball 20 under the hitch 22. At step 92 the sensing device 52 re-senses the location of the targets 54. The controller 62 receives an input signal indicative of the re-sensed location of the targets 54 and determines whether the ball 20 has reached the hitch 22 at step 94. If the ball 20 has not reached the hitch 22, then the method 80 returns to step 84. In this way, the method 80 provides real-time continuous monitoring of the distance and steer angle of the ball 20 relative to the hitch 22 and allows for correction of the steer angle as the towing vehicle 12 moves towards the towed vehicle 14. If the ball 20 has reached the hitch 22, then the method 80 proceeds to step 96 and the towing vehicle 12 is docked with the towed vehicle 14. In one embodiment the controller 62 engages the automatic braking system 58 to slow or stop the towing vehicle 12 from moving at step 96. In an alternate embodiment, a dashboard signal light or other method of communicating that the ball 20 has been positioned proximate the hitch 22 is communicated to an operator of the towing vehicle 12 and the operator of the towing vehicle 12 engages the brakes. Additionally, the controller 62 may activate the automatic braking system 58 at any time to prevent the rearward motion of the towing vehicle 12 if the object pre-impact sensor 60 sends a signal to the controller 62 indicative of the presence of an object behind the towing vehicle 12 in order to prevent an undesirable impact.

Figure 3:
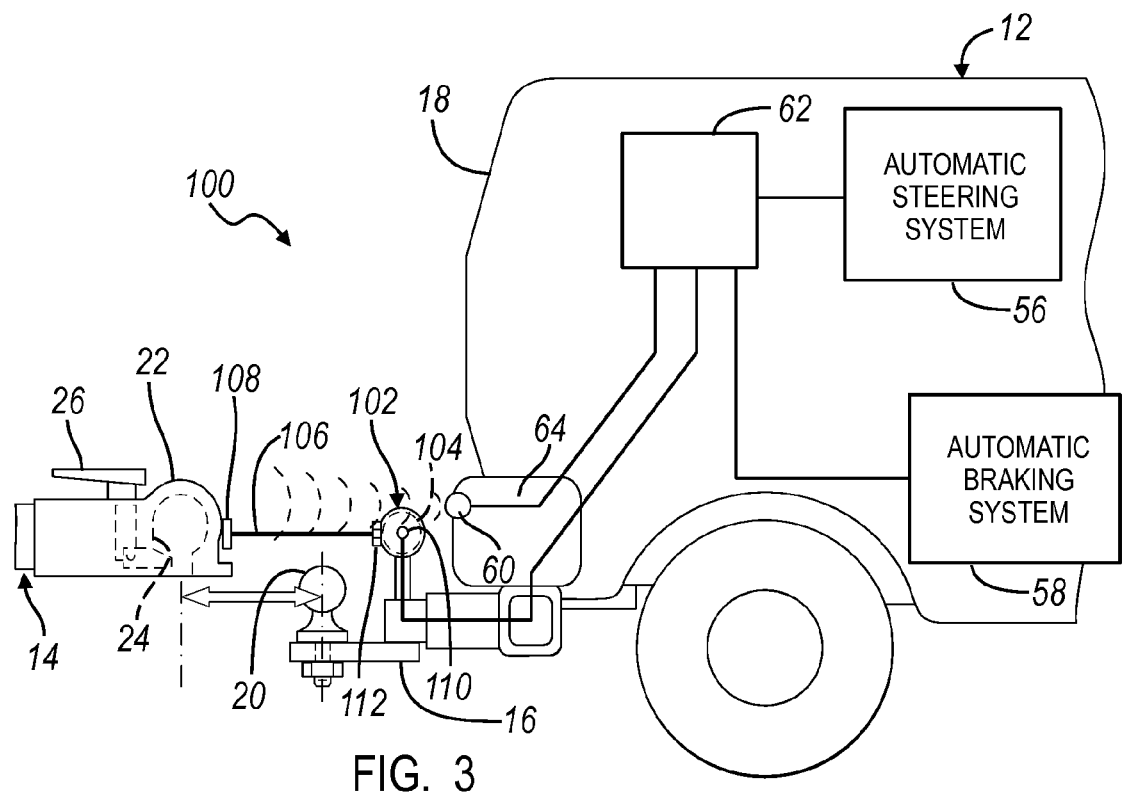
FIG. 3 is a schematic diagram of another embodiment of a docking assistance system according to the principles of the present invention.

With reference to FIG. 3, an alternate embodiment of the docking assistance system is generally indicated by reference number 100. The docking assistance system 100 includes the automatic steering system 56, the automatic braking system 58, the object pre-impact sensor 60, and the controller 62 as described above and illustrated in FIG. 1. However, the sensing device 52 of the docking assistance system 10 is replaced with a mechanical locating device 102. The mechanical locating device 102 is fixedly coupled to the tongue 16 of the towing vehicle 12 forward of the ball 20. The mechanical locating device 102 includes a spool 104 having a line 106 wrapped therearound. The spool 104 is biased by a biasing member (not shown) such that the line 106 is in tension when pulled away from the spool 104. The line 106 may take various forms, for example, a wire or rope, without departing from the scope of the present invention. The line 106 is fixed at one end to the spool 104 and fixed at an opposite end to a sensing element or attachment device 108. The attachment device 108 is a magnet in the present embodiment, however, other types of attachment devices may be employed such as, for example, an adhesive or a loop of line that can be secured around the hitch 22 or lock 26. The mechanical locating device 102 further includes a sensor 110 coupled to the spool 104 to determine the length of the line 106 that has been extended from the spool 104. An additional sensor 112 may be located within or on the spool 104 to determine the exit angle of the line 106 relative to the mechanical locating device 102. The sensors 110, 112 are in communication with the controller 62 and are operable to send signals indicative of the length and exit angle of the line 106, as noted above.

The docking assistance system 100 is activated when an operator of the towing vehicle 12 initiates a docking mode indicative of a desire to dock or couple the ball 20 to the hitch 22. Initiation of the docking mode may be accomplished by engaging a switch or lever (not shown) in the towing vehicle 12 that communicates with the controller 62. When in docking mode, the controller 62 determines the position of the ball 20 of the towing vehicle relative to the hitch 22 of the towed vehicle 14 using the signals received from the first and second sensors 110, 112. More specifically, the controller 62 uses software algorithms to calculate the distance and angle of the ball 20 relative to the hitch 22 based on the extended length of the line 106 and the angle of the line 106 relative to the mechanical locating device 102. The controller 62 sends control signals to the automatic steering assembly 56 in order to direct the towing vehicle 12 toward the towed vehicle 14 to align the ball 20 with the hitch 22. An operator of the towing vehicle 12 controls the motion of the towing vehicle 12 by releasing the brakes and the controller 62 corrects the position of the ball 20 relative to the hitch 22 in real-time as the towing vehicle 12 moves backwards towards the towed vehicle 14. Accordingly, the line 106 must remain in tension during movement of the towing vehicle 12 in order to accurately measure the length the line 106 extends from the spool 104. The controller 62 engages the automatic braking system 58 to slow or stop rearward motion of the towing vehicle 12 when the controller 62 determines that the ball 20 is proximate to the hitch 22. Additionally, the controller 62 may activate the automatic braking system 58 to prevent rearward motion of the towing vehicle 12 if the object pre-impact sensor 60 sends a signal to the controller 62 indicative of the presence of an object behind the towing vehicle 12 in order to prevent an undesirable impact.

The description of the invention is merely exemplary in nature and variations that do not depart from the gist of the invention are intended to be within the scope of the invention. Such variations are not to be regarded as a departure from the spirit and scope of the invention.

We claim the following:

1. A system for assisting in coupling a vehicle to a remote coupling member, the vehicle having at least one steerable wheel, the system comprising:
    a vehicle coupling member fixedly secured to the vehicle, wherein the coupling member is configured to receive the remote coupling member;
    a sensing device mounted to the vehicle;
    a steering system mounted in the vehicle and coupled to the at least one steerable wheel of the vehicle;
    an adjustable suspension system operable to control a height of the vehicle;
    at least one sensing element attachable to the remote coupling member; and
    a controller in communication with the sensing device, the adjustable suspension system, and the steering system, wherein the controller includes a first control logic for receiving a first sensor input signal from the sensing device indicative of the location of the at least one sensing element relative to the vehicle coupling member, a second control logic for receiving a second sensor input signal from the sensing device indicative of the location of the at least one sensing element relative to the vehicle coupling member after the vehicle has moved, a third control logic for determining the location of the vehicle coupling member relative to the remote coupling member by comparing the first input sensor signal to the second input sensor signal, a fourth control logic for sending a steering control signal to the steering control system to steer the vehicle coupling member toward the remote coupling member, and a fifth control logic for sending a suspension control signal to the adjustable suspension system in order to control a height of the vehicle in order to match a height of the vehicle coupling member with a height of the remote coupling member.

2. The system of claim 1 further comprising a braking system in communication with the controller and operable to brake the vehicle, and the controller includes a sixth control logic for sending a braking control signal to the braking system to brake the vehicle.

3. The system of claim 2 further comprising an object sensor mounted on the vehicle and in communication with the controller, wherein the control logic includes a seventh control logic for receiving an object detection signal indicative of an object located between the vehicle and the remote coupling member, wherein the braking control signal is sent when the controller receives the object detection signal.

4. The system of claim 1 wherein the at least one sensing element includes a plurality of targets.

5. The system of claim 4 wherein the targets are placed on the remote coupling member at known locations at known distances apart from one another.

6. The system of claim 5 wherein the controller determines the distance and a steer angle from the first and second input sensor signals by comparing the sensed location of the plurality of targets relative to the known location of the plurality of targets.

7. The system of claim 1 wherein the sensing device is a video camera that optically detects the at least one sensing element.

8. The system of claim 1 wherein the at least one sensing element is magnetically secured to the remote coupling member.

9. The system of claim 1 wherein the sensing device includes a spool having a line that is secured at one end to the spool and secured at an opposite end to the at least one sensing element, and the sensing device is operable to detect the angle from which the line extends out from the sensing device and is operable to detect the length of the line between the sensing device and the sensing element.

10. A method for coupling a vehicle coupling member on a vehicle to a remote coupling member, the method comprising:
    sensing a location of a sensing element located on the remote coupling member relative to the vehicle coupling member;
    calculating a distance between the vehicle coupling member and the remote coupling member;
    calculating a steer angle between the vehicle coupling member and the remote coupling member;
    steering the vehicle using an automatic steering system at the steer angle;
    controlling an adjustable suspension system in order to control a height of the vehicle in order to match a height of the vehicle coupling member with a height of the remote coupling member;
    moving the vehicle;
    sensing a location of the sensing element after the vehicle has moved;
    determining whether the vehicle coupling member has reached the remote coupling member.

11. The method of claim 10 wherein the method begins when an operator of the vehicle initiates the method.

12. The method of claim 10 further comprising the step of braking the vehicle using an automatic braking system if an object detection sensor detects an object behind the vehicle.

13. The method of claim 10 wherein the steps of calculating the distance and the steer angle include comparing the sensed location of the sensing element to a known location of the sensing element.

14. The method of claim 10 wherein the steer angle is an angle between a longitudinal axis of the remote coupling member relative to the vehicle coupling member.

15. The method of claim 10 wherein the method repeats until the vehicle coupling member has reached the remote coupling member or the operator of the vehicle deactivates the method.

* * * * *